US012151347B2

(12) United States Patent
Harrell

(10) Patent No.: US 12,151,347 B2
(45) Date of Patent: Nov. 26, 2024

(54) COMBINATION TOOL ASSEMBLY

(71) Applicant: Aaron Harrell, Indianapolis, IN (US)

(72) Inventor: Aaron Harrell, Indianapolis, IN (US)

( * ) Notice: Subject to any disclaimer, the term of this patent is extended or adjusted under 35 U.S.C. 154(b) by 288 days.

(21) Appl. No.: 17/867,807

(22) Filed: Jul. 19, 2022

(65) Prior Publication Data

US 2024/0025018 A1 Jan. 25, 2024

(51) Int. Cl.
*B25B 7/04* (2006.01)
*B25F 1/00* (2006.01)

(52) U.S. Cl.
CPC ................ *B25B 7/04* (2013.01); *B25F 1/003* (2013.01)

(58) Field of Classification Search
CPC .. B25B 7/04; B25B 7/10; B25B 13/04; B25B 13/08; B25B 13/56; B25F 1/003; B25F 1/04
USPC .................................. 81/416, 414, 407–413
See application file for complete search history.

(56) References Cited

U.S. PATENT DOCUMENTS 1,442,083 A 1/1923 Meyer
1,522,695 A * 1/1925 Noreen .................. B25F 1/003 7/127
3,946,453 A 3/1976 Torres
4,773,288 A * 9/1988 Jang .......................... B25B 7/10 81/409.5
D327,208 S * 6/1992 Wehling ........................... D8/55
5,119,520 A * 6/1992 Finn ........................ B25F 1/003 81/319
5,685,205 A 11/1997 Suksi
9,138,882 B2 9/2015 Martin, Sr.
D865,465 S 11/2019 Moyer
10,661,414 B2 * 5/2020 Moyer ...................... B25B 7/10
2004/0016325 A1 1/2004 Smith
2006/0236823 A1 10/2006 MacLain
2010/0242183 A1 * 9/2010 Redfern .................. B25B 15/04 7/128

FOREIGN PATENT DOCUMENTS

GB 264383 1/1927

* cited by examiner

*Primary Examiner* — Hadi Shakeri

(57) ABSTRACT

A combination tool assembly includes a pair of pliers. The pair of pliers is releasably attachable together thereby facilitating the pair of pliers to be closed around an object for gripping the object. The pair of pliers is detachable from each other and each of the pliers has a receiving element. A ratcheting driver is rotatably integrated into a respective one of the pliers and the engagement releasably engages a respective one of the pliers for pivotally attaching the pair of pliers together. A plurality of wrenches is provided and respective ones of the wrenches are removably attachable to the receiving element in a respective one of the pliers. In this way a user can accomplish a variety of jobs with a single tool thereby reducing the number of tools the user must carry.

10 Claims, 4 Drawing Sheets

COMBINATION TOOL ASSEMBLY

BACKGROUND OF THE INVENTION

(1) Field of the Invention

The disclosure relates to tool devices and more particularly pertains to a new tool device for performing a variety of jobs with a single tool. The device includes a pair of pliers that are removably attached together via a ratchet driver. The device includes a plurality of wrenches and respective ones of the wrenches are releasably attachable to a respective plier for performing a variety of jobs.

(2) Description of Related Art Including Information Disclosed Under 37 CFR 1.97 and 1.98

The prior art relates to tool devices including a closed end wrench with a ratcheting ring. The prior art discloses a pair of pliers with has an open end wrench formed into an end of each handle of the pliers. The prior art discloses a pair of pliers with has a closed end wrench formed into an end of each handle of the pliers. The prior art discloses an adjustable wrench device that includes a screw for adjusting an open end wrench and closed end wrench. The prior art discloses a pair of pliers having an adjustable size.

BRIEF SUMMARY OF THE INVENTION

An embodiment of the disclosure meets the needs presented above by generally comprising a pair of pliers. The pair of pliers is releasably attachable together thereby facilitating the pair of pliers to be closed around an object for gripping the object. The pair of pliers is detachable from each other and each of the pliers has a receiving element. A ratcheting driver is rotatably integrated into a respective one of the pliers and the engagement releasably engages a respective one of the pliers for pivotally attaching the pair of pliers together. A plurality of wrenches is provided and respective ones of the wrenches are removably attachable to the receiving element in a respective one of the pliers. In this way a user can accomplish a variety of jobs with a single tool thereby reducing the number of tools the user must carry.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
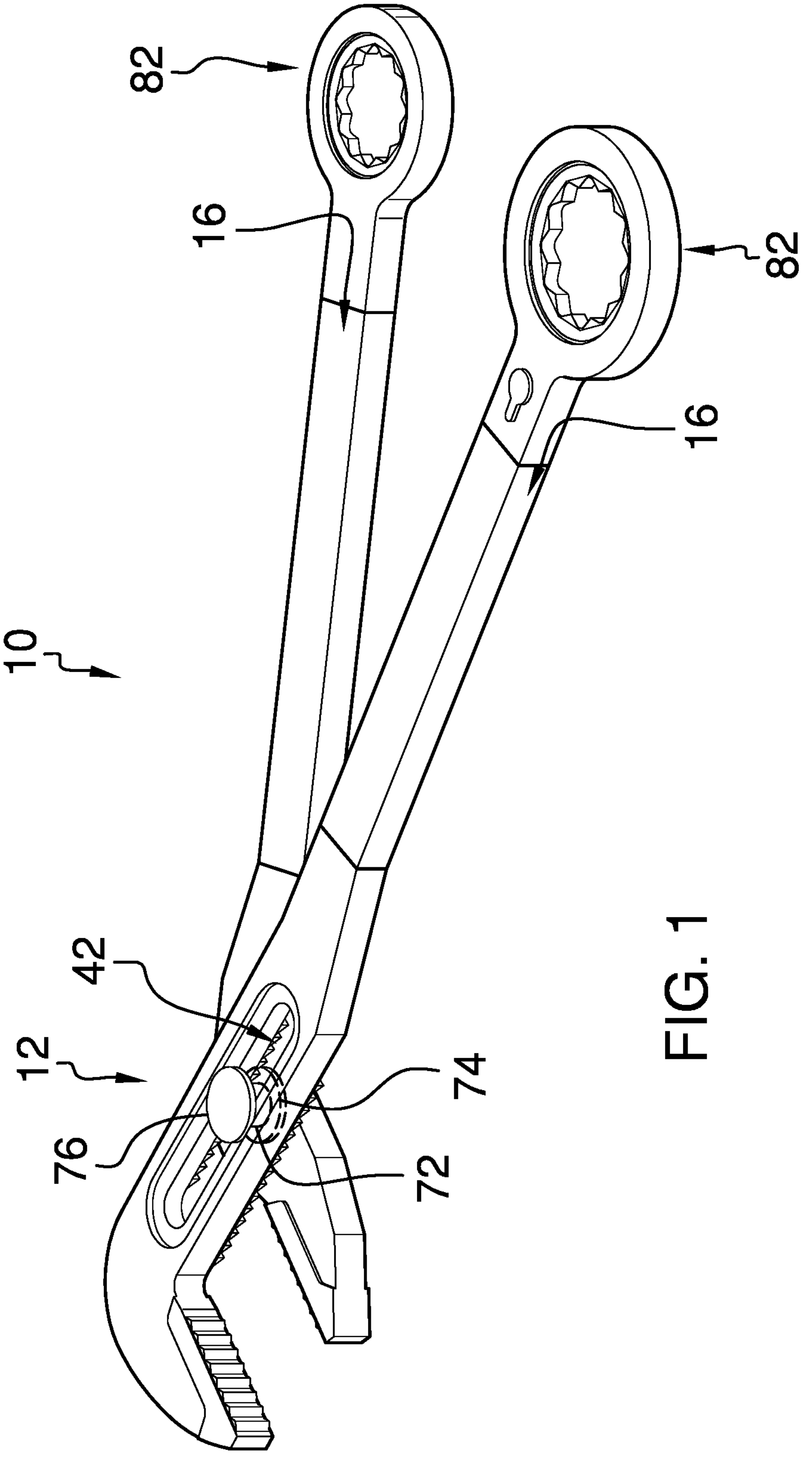
FIG. 1 is a perspective view of a combination tool assembly according to an embodiment of the disclosure.
Figure 2:
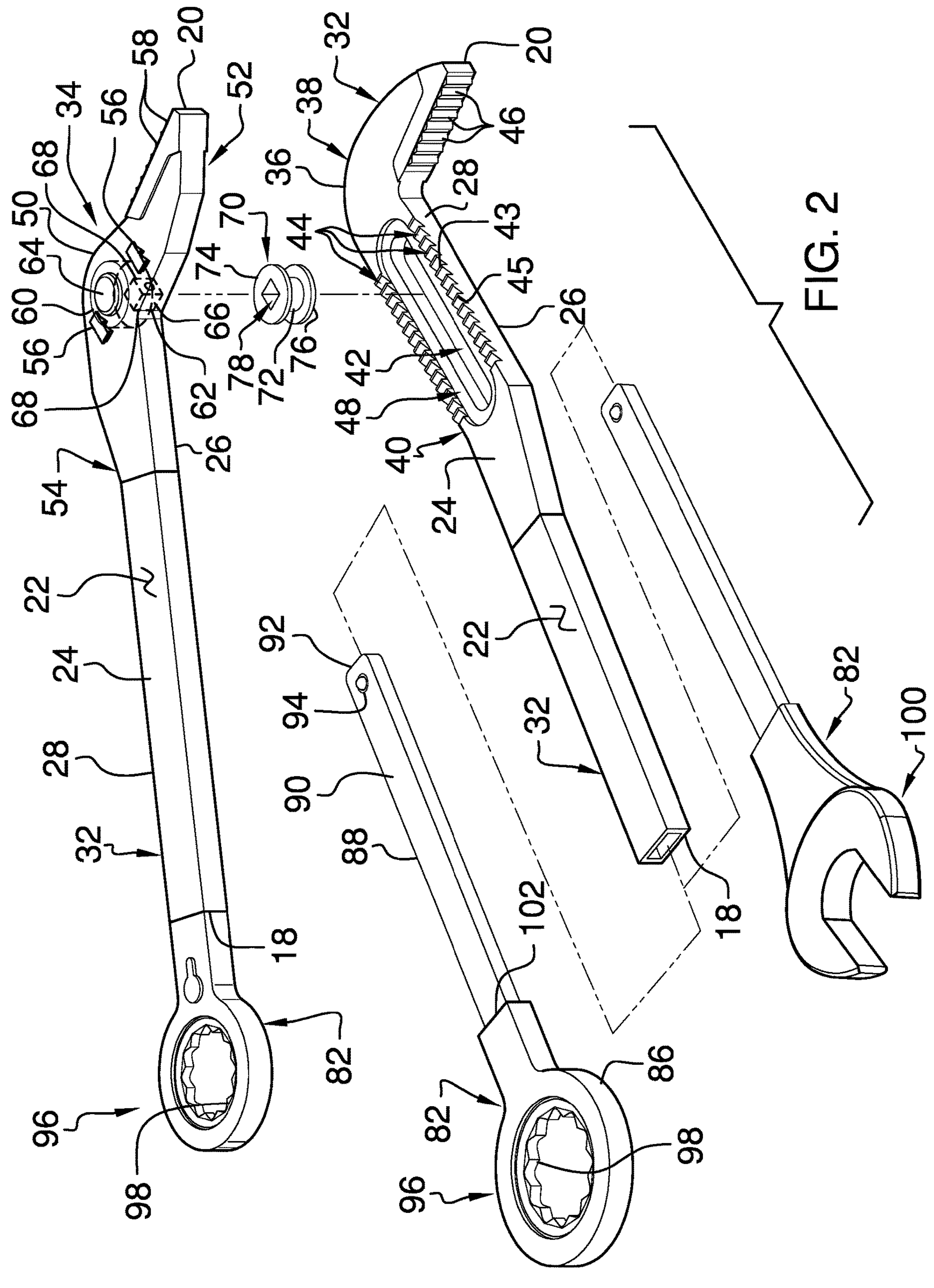
FIG. 2 is an exploded perspective view of an embodiment of the disclosure.
Figure 3:
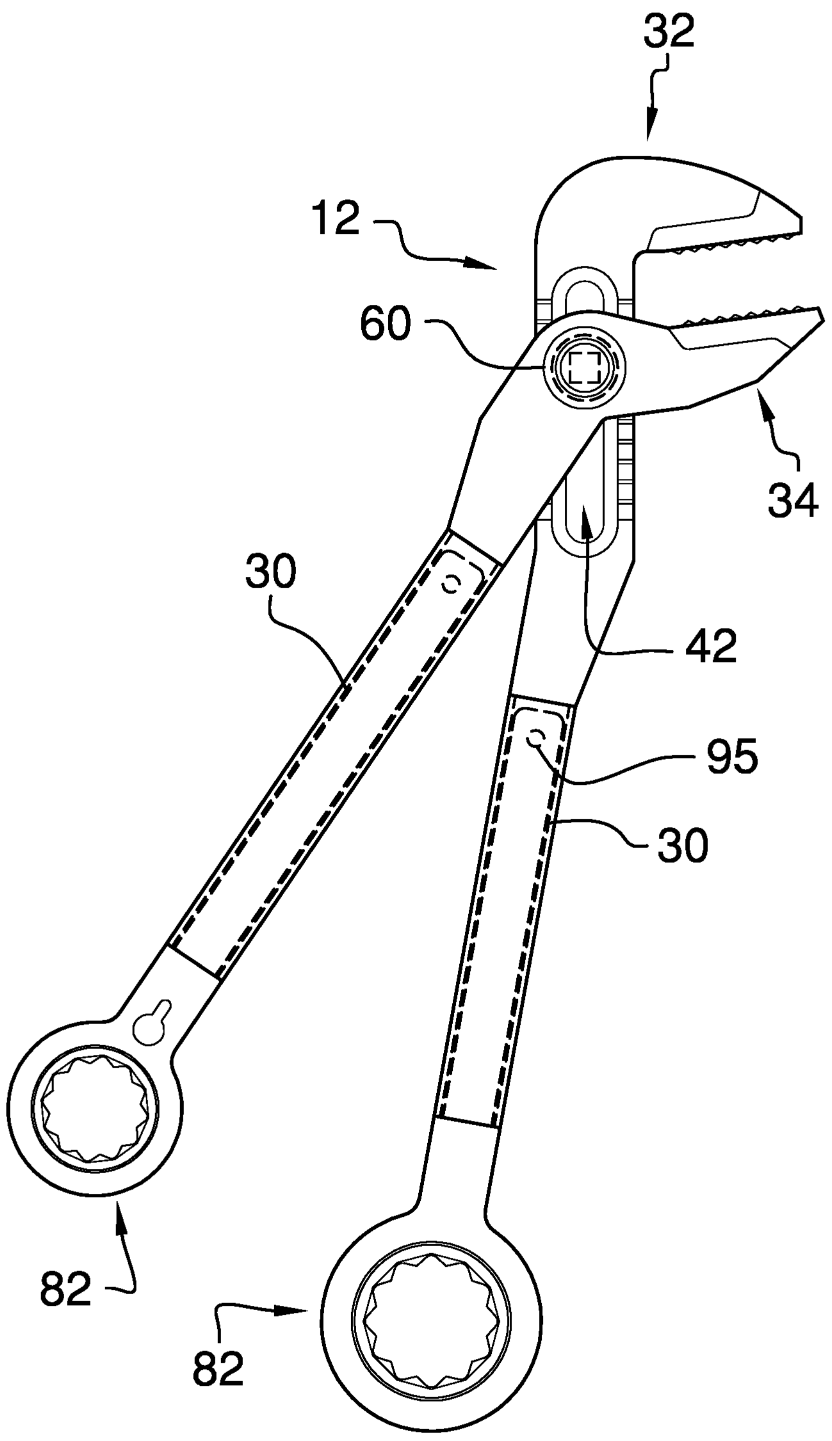
FIG. 3 is a top phantom view of an embodiment of the disclosure.
Figure 4:
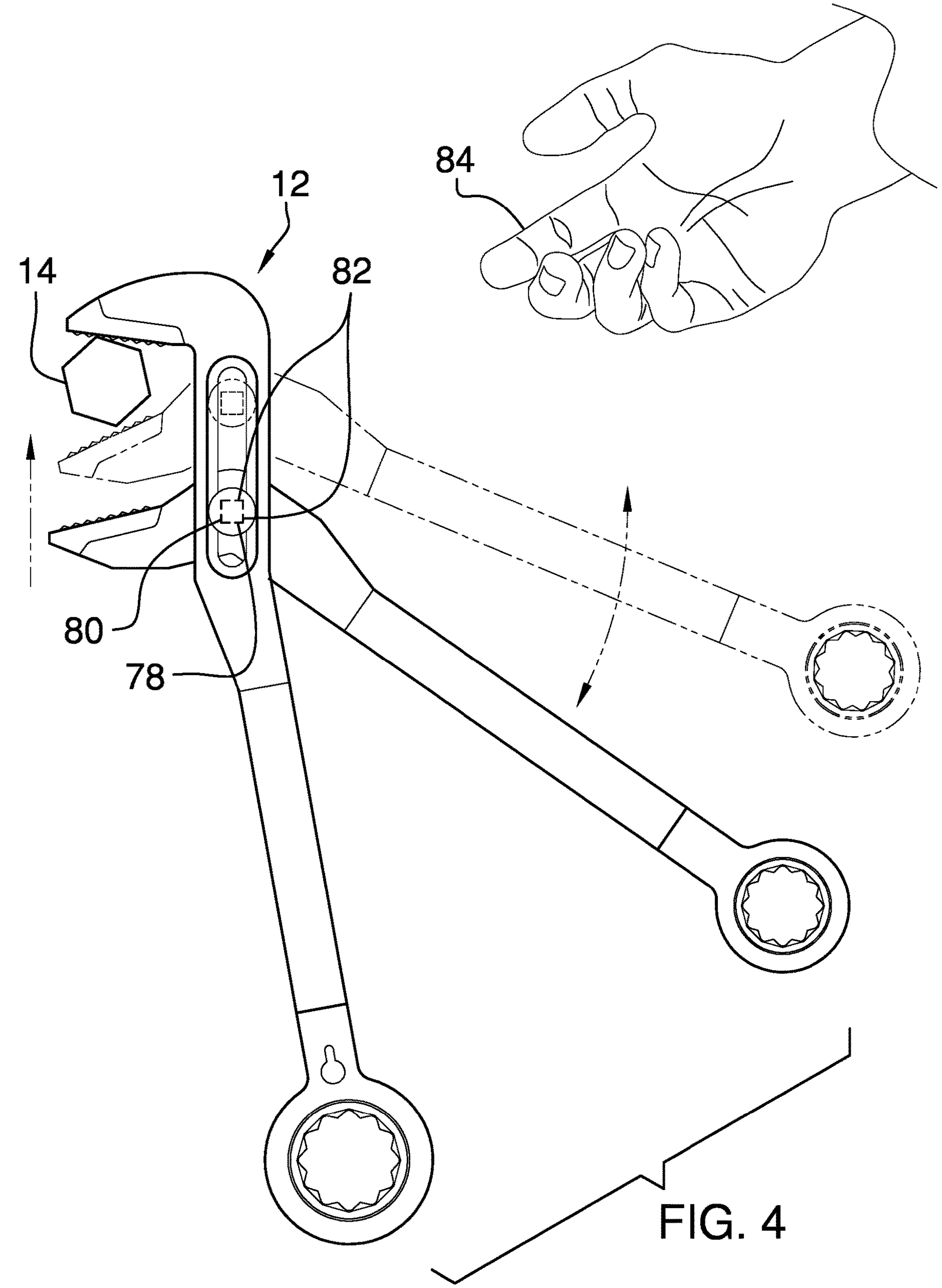
FIG. 4 is a bottom view of an embodiment of the disclosure.

With reference now to the drawings, and in particular to FIGS. 1 through 4 thereof, a new tool device embodying the principles and concepts of an embodiment of the disclosure and generally designated by the reference numeral 10 will be described.

As best illustrated in FIGS. 1 through 4, the combination tool assembly 10 generally comprises a pair of pliers 12 that is releasably attachable together thereby facilitating the pair of pliers 12 to be closed around an object 14 for gripping the object 14. The pair of pliers 12 is detachable from each other and each of the pliers 12 has a receiving element 16 that is integrated into the pliers 12. Each of the pliers 12 has a first end 18, a second end 20 and an outer surface 22 extending between the first end 18 and the second end 20, and the outer surface 22 of each of the pliers 12 has an upper side 24, a lower side 26 and a lateral side 28 extending between the upper side 24 and the lower side 26. Each of the pliers 12 is elongated between the first end 18 and the second end 20 and first end 18 of each of the pliers 12 is open. Furthermore, each of the pliers 12 has a hollow portion 30 extending from the first end 18 toward the second end 20 to define the receiving element 16.

The pair of pliers 12 includes a first plier 32 and a second plier 34. The first plier 32 has a bend 36 spaced from the second end 20 of the first plier 32 to define a jaw portion 38 of the first plier 32 that is perpendicularly oriented with a handle portion 40 of the first plier 32. The first plier 32 has a slot 42 extending through the handle portion 40 of the first plier 32. The slot 42 is elongated along an axis extending between the bend 36 and the first end 18 of the first plier 32 and the slot 42 is positioned adjacent to the bend 36. The upper side 24 of the outer surface 22 of the first plier 32 has a plurality of depressions 44 that are spaced apart from each other and are distributed along a substantial length of the slot 42. The plurality of depressions 44 is positioned on either side of the slot 42 and each of the depressions 44 has perpendicular face 43 and a sloped face 45.

The lateral side 28 of the first plier 32 corresponding to the jaw portion 38 of the first plier 32 has a plurality of teeth 46 extending away from the jaw portion 38 of the first plier 32. The upper side 24 of the outer surface 22 of the first plier 32 has a recess 48 extending around a full perimeter of the slot 42. The second plier 34 has a bend 50 that is spaced from the second end 20 of the second plier 34 to define a jaw portion 52 of the second plier 34 forming an angle with a handle portion 54 of the second plier 34. The lower side 26 of the outer surface 22 corresponding to the handle portion 54 of the second plier 34 has a pair of grips 56 each extending away from the second plier 34. The grips 56 are positioned proximate the bend 50 on the second plier 34. Additionally, the lateral side 28 of the outer surface 22 corresponding to the jaw portion 38 of the second plier 34 has a plurality of teeth 58 extending away from the jaw portion 38 of the second plier 34.

A ratcheting driver 60 is rotatably integrated into a respective one of the pliers 12 and the ratcheting driver 60 has an engagement 62 and a release button 64. The engagement 62 is biased into an engaging condition and the engagement 62 is urged into a releasing condition when the release button 64 is depressed. The engagement 62 extends away from the lower side 26 of the outer surface 22 of the second plier 34 and the release button 64 is positioned on the upper side 24 of the outer surface 22 of the second plier 34. Additionally, the ratcheting driver 60 is aligned with the bend 50 in the second plier 34. The engagement 62 has an outside surface 66 and the outside surface 66 has a plurality of intersecting sides 68 such that the engagement 62 has a rectangular shape. The engagement 62 may include a spring loaded ball that is biased outwardly from a respective intersecting side 68 and which is facilitated to recess into the engagement 62 when the release button 64 is depressed.

A coupler 70 is provided which has a stem 72 extending between a first disk 74 and a second disk 76. The stem 72 extends through the slot 42 in the first plier 32 has the first disk 74 resting against the lower side 26 of the outer surface 22 of the first plier 32 and has the second disk 76 resting in the recess 48 in the upper side 24 of the outer surface 22 of the first plier 32. In this way the coupler 70 is slidably retained in the slot 42 has the second disk 76 being oriented coplanar with the upper side 24 of the outer surface 22 of the first plier 32. The coupler 70 has a well 78 extending through the second disk 76 and into the stem 72. The well 78 has a bounding surface 80 and the bounding surface 80 has a plurality of intersecting sides 82 such that the well 78 has a rectangular shape. Furthermore, the well 78 insertably receives the engagement 62 of the ratcheting driver 60 such that each of the intersecting sides 68 of the outside surface 66 of the engagement 62 conforms to a respective one of the intersecting sides 82 of the bounding surface 80 of the well 78. In this way the engagement 62 is inhibited from rotating in the well 78.

The engagement 62 engages the bounding surface 80 of the well 78 when the engagement 62 is biased into the engaging condition. In this way the engagement 62 is inhibited from being removed from the well 78. The engagement 62 disengages the bounding surface 80 of the well 78 when the engagement 62 is urged into the releasing condition thereby facilitating the engagement 62 to be removed from the well 78. The second plier 34 is slidably adjustable on the first plier 32 to facilitate each of the grips 56 on the second plier 34 to engage a respective pair of the depressions 44 in the upper side 24 of the outer surface 22 of the first plier 32. In this way the pair of pliers 12 can be adjusted to grip a variety of sizes of objects 14.

A plurality of wrenches 82 is provided and a respective ones of the wrenches 82 is removably attachable to the receiving element 16 in a respective one of the pliers 12. In this way the wrenches 82 and the pliers 12 facilitate a user 84 to accomplish a variety of jobs with a single tool thereby reducing the number of tools the user 84 must carry. Each of the wrenches 82 has a head 86 and a member 88 extending away from the head 86. The member 88 of each of the wrenches 82 has a top side 90 and a distal end 92 with respect to the head 86. The first end 18 of a respective one of the first plier 32 or the second plier 34 insertably receives the member 88 of a respective one of the wrenches 82. In this way the head 86 of the respective wrench 82 is disposed on the first end 18 of the respective first plier 32 or second plier 34. The plurality of wrenches 82 may include common sizes of both standard wrenches and metric wrenches.

The member 88 of each of the wrenches 82 has a lock 94 that is movably integrated into the top side 90 and the lock 94 on the member 88 is positioned adjacent to the distal end 92. The lock 94 releasably engages a detent 95 within the respective plier 12 when the respective wrench 82 is attached to the respective plier 12. As is most clearly shown in figure one, the plurality of wrenches 82 may include closed end wrenches 96 that have a ratcheting ring 98 for either loosening or tightening a fastener. As is most clearly shown in FIG. 2, the plurality of wrenches 82 may include open end wrenches 100 for either loosening or tightening a fastener. The member 88 of each of the wrenches 82 has a height and a width being less than a height and a width of a rear side 102 of the head 86. Furthermore, the rear side 102 of the head 86 of a respective wrench 82 abuts the first end 18 of the respective plier 12 when the respective wrench 82 is attached to the respective plier 12.

In use, the engagement 62 is seated into the well 78 in the coupler 70 to pivotally attach the pair of pliers 12 together. In this way the pliers 12 can be employed in the traditional convention of gripping an object 14, such as fasteners for example, to twist the object 14. Respective ones of the wrenches 82 can each be attached to the receiving element 16 of a respective plier 12. In this way the pair of pliers 12 can perform a variety of jobs thereby reducing the number of tools that must be carried. Thus, a technician working in a lift bucket, for example, can reduce the number of tools they must carry to perform their duties.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A combination tool assembly for combining pliers and wrenches, said assembly comprising:

a pair of pliers, said pair of pliers being releasably attachable together thereby facilitating said pair of pliers to be closed around an object for gripping the object, said pair of pliers being detachable from each other, each of said pliers has a receiving element being integrated into said pliers;

a ratcheting driver being rotatably integrated into a respective one of said pliers, said ratcheting driver has an engagement and a release button, said engagement being biased into an engaging condition, said engagement being urged into a releasing condition when said button is depressed, said engagement releasably engaging a respective one of said pliers for pivotally attaching said pair of pliers together;

a plurality of wrenches, respective ones of said wrenches being removably attachable to said receiving element in a respective one of said pliers wherein said wrenches and said pliers are configured to facilitate a user to accomplish a variety of jobs with a single tool thereby reducing the number of tools the user must carry;

wherein each of said pliers has a first end, a second end and an outer surface extending between said first end and said second end, said outer surface of each of said pliers has an upper side, a lower side and a lateral side extending between said upper side and said lower side, each of said pliers being elongated between said first end and said second end, first end of each of said pliers being open, each of said pliers has a hollow portion extending from said first end toward said second end to define said receiving element;

wherein said pair of pliers includes a first plier and a second plier;

wherein said second plier has a bend being spaced from said second end of said second plier to define a jaw portion of said second plier forming an angle with a handle portion of said second plier;

wherein said lower side of said outer surface corresponding to said handle portion of said second plier has a pair of grips each extending away from said second plier, said grips being positioned proximate said bend on said second plier; and wherein said lateral side of said outer surface corresponding to said jaw portion of said second plier has a plurality of teeth extending away from said jaw portion of said second plier.

2. The assembly according to claim 1, wherein:

said pair of pliers includes a first plier and a second plier;

said first plier has a bend being spaced from said second end of said first plier to define a jaw portion of said first plier being perpendicularly oriented with a handle portion of said first plier;

said first plier has a slot extending through said handle portion of said first plier, said slot being elongated along an axis extending between said bend and said first end of said first plier, said slot being positioned adjacent to said bend;

said upper side of said outer surface of said first plier has a plurality of depressions being spaced apart from each other and being distributed along a substantial length of said slot, said plurality of depressions being positioned on either side of said slot;

said lateral side of said first plier corresponding to said jaw portion of said first plier has a plurality of teeth extending away from said jaw portion of said first plier; and said upper side of said outer surface of said first plier has a recess extending around a full perimeter of said slot.

3. The assembly according to claim 1, wherein said engagement extends away from said lower side of said outer surface of said second plier, said button being positioned on said upper side of said outer surface of said second plier, said ratcheting driver being aligned with said bend in said second plier, said engagement has an outside surface, said outside surface has a plurality of intersecting sides such that said engagement has a rectangular shape.

4. The assembly according to claim 1, wherein:

said upper side of said outer surface of said first plier has a plurality of depressions being spaced apart from each other and being distributed along said first plier; and said second plier is slidably adjustable on said first plier to facilitate each of said grips on said second plier to engage a respective pair of said depressions in said upper side of said outer surface of said first plier thereby facilitating said pair of pliers to be adjusted to grip a variety of sizes of objects.

5. The assembly according to claim 1, wherein each of said wrenches has a head and a member extending away from said head, said member of each of said wrenches has a top side and a distal end with respect to said head, said first end of a respective one of said first plier or said second plier insertably receiving said member of a respective one of said wrenches such that said head of said respective wrench is disposed on said first end of said respective first plier or second plier.

6. The assembly according to claim 5, wherein said member of each of said wrenches has a lock being movably integrated into said top side, said lock on said member being positioned adjacent to said distal end, said lock releasably engaging a detent within said respective plier when said respective wrench is attached to said respective plier.

7. A combination tool assembly for combining pliers and wrenches, said assembly comprising:

a pair of pliers, said pair of pliers being releasably attachable together thereby facilitating said pair of pliers to be closed around an object for gripping the object, said pair of pliers being detachable from each other, each of said pliers has a receiving element being integrated into said pliers;

a ratcheting driver being rotatably integrated into a respective one of said pliers, said ratcheting driver has an engagement and a release button, said engagement being biased into an engaging condition, said engagement being urged into a releasing condition when said button is depressed, said engagement releasably engaging a respective one of said pliers for pivotally attaching said pair of pliers together;

a plurality of wrenches, respective ones of said wrenches being removably attachable to said receiving element in a respective one of said pliers wherein said wrenches and said pliers are configured to facilitate a user to accomplish a variety of jobs with a single tool thereby reducing the number of tools the user must carry;

wherein each of said pliers has a first end, a second end and an outer surface extending between said first end and said second end, said outer surface of each of said pliers has an upper side, a lower side and a lateral side extending between said upper side and said lower side, each of said pliers being elongated between said first end and said second end, first end of each of said pliers being open, each of said pliers has a hollow portion extending from said first end toward said second end to define said receiving element;

wherein said pair of pliers includes a first plier and a second plier;

wherein said first plier has a bend being spaced from said second end of said first plier to define a jaw portion of said first plier being perpendicularly oriented with a handle portion of said first plier;

wherein said first plier has a slot extending through said handle portion of said first plier, said slot being elongated along an axis extending between said bend and said first end of said first plier, said slot being positioned adjacent to said bend;

wherein said upper side of said outer surface of said first plier has a plurality of depressions being spaced apart from each other and being distributed along a substantial length of said slot, said plurality of depressions being positioned on either side of said slot;

wherein said lateral side of said first plier corresponding to said jaw portion of said first plier has a plurality of teeth extending away from said jaw portion of said first plier;

wherein said upper side of said outer surface of said first plier has a recess extending around a full perimeter of said slot; and a coupler having a stem extending between a first disk and a second disk, said stem extending through said slot in said first plier has said first disk resting against said lower side of said outer surface of said first plier and has said second disk resting in said recess in said upper side of said outer surface of said first plier such that said coupler is slidably retained in said slot, said second disk being oriented coplanar with said upper side of said outer surface of said first plier.

8. The assembly according to claim 7, wherein:

said engagement has an outside surface has a plurality of intersecting sides;

said coupler has a well extending through said second disk and into said stem, said well has a bounding surface, said bounding surface has a plurality of intersecting sides such that said well has a rectangular shape, said well insertably receiving said engagement of said ratcheting driver such that each of said intersecting sides of said outside surface of said engagement conforms to a respective one of said intersecting sides of said bounding surface of said well thereby inhibiting said engagement from rotating in said well.

9. The assembly according to claim 8, wherein said engagement engages said bounding surface of said well when said engagement is biased into said engaging condition for inhibiting said engagement from being removed from said well, said engagement disengaging said bounding surface of said well when said engagement is urged into said releasing condition thereby facilitating said engagement to be removed from said well.

10. A combination tool assembly for combining pliers and wrenches, said assembly comprising:

a pair of pliers, said pair of pliers being releasably attachable together thereby facilitating said pair of pliers to be closed around an object for gripping the object, said pair of pliers being detachable from each other, each of said pliers has a receiving element being integrated into said pliers, each of said pliers has a first end, a second end and an outer surface extending between said first end and said second end, said outer surface of each of said pliers has an upper side, a lower side and a lateral side extending between said upper side and said lower side, each of said pliers being elongated between said first end and said second end, first end of each of said pliers being open, each of said pliers has a hollow portion extending from said first end toward said second end to define said receiving element, said pair of pliers including a first plier and a second plier, said first plier has a bend being spaced from said second end of said first plier to define a jaw portion of said first plier being perpendicularly oriented with a handle portion of said first plier, said first plier has a slot extending through said handle portion of said first plier, said slot being elongated along an axis extending between said bend and said first end of said first plier, said slot being positioned adjacent to said bend, said upper side of said outer surface of said first plier has a plurality of depressions being spaced apart from each other and being distributed along a substantial length of said slot, said plurality of depressions being positioned on either side of said slot, said lateral side of said first plier corresponding to said jaw portion of said first plier has a plurality of teeth extending away from said jaw portion of said first plier, said upper side of said outer surface of said first plier has a recess extending around a full perimeter of said slot, said second plier has a bend being spaced from said second end of said second plier to define a jaw portion of said second plier forming an angle with a handle portion of said second plier, said lower side of said outer surface corresponding to said handle portion of said second plier has a pair of grips each extending away from said second plier, said grips being positioned proximate said bend on said second plier, said lateral side of said outer surface corresponding to said jaw portion of said second plier has a plurality of teeth extending away from said jaw portion of said second plier;

a ratcheting driver being rotatably integrated into a respective one of said pliers, said ratcheting driver has an engagement and a release button, said engagement being biased into an engaging condition, said engagement being urged into a releasing condition when said button is depressed, said engagement extending away from said lower side of said outer surface of said second plier, said button being positioned on said upper side of said outer surface of said second plier, said ratcheting driver being aligned with said bend in said second plier, said engagement has an outside surface, said outside surface has a plurality of intersecting sides such that said engagement has a rectangular shape;

a coupler having a stem extending between a first disk and a second disk, said stem extending through said slot in said first plier has said first disk resting against said lower side of said outer surface of said first plier and has said second disk resting in said recess in said upper side of said outer surface of said first plier such that said coupler is slidably retained in said slot, said second disk being oriented coplanar with said upper side of said outer surface of said first plier, said coupler has a well extending through said second disk and into said stem, said well has a bounding surface, said bounding surface has a plurality of intersecting sides such that said well has a rectangular shape, said well insertably receiving said engagement of said ratcheting driver such that each of said intersecting sides of said outside surface of said engagement conforms to a respective one of said intersecting sides of said bounding surface of said well thereby inhibiting said engagement from rotating in said well, said engagement engaging said bounding surface of said well when said engagement is biased into said engaging condition for inhibiting said engagement from being removed from said well, said engagement disengaging said bounding surface of said well when said engagement is urged into said releasing condition thereby facilitating said engagement to be removed from said well, said second plier being slidably adjustable on said first plier to facilitate each of said grips on said second plier to engage a respective pair of said depressions in said upper side of said outer surface of said first plier thereby facilitating said pair of pliers to be adjusted to grip a variety of sizes of objects; and a plurality of wrenches, respective ones of said wrenches being removably attachable to said receiving element in a respective one of said pliers wherein said wrenches and said pliers are configured to facilitate a user to accomplish a variety of jobs with a single tool thereby reducing the number of tools the user must carry, each of said wrenches has a head and a member extending away from said head, said member of each of said wrenches has a top side and a distal end with respect to said head, said first end of a respective one of said first plier or said second plier insertably receiving said member of a respective one of said wrenches such that said head of said respective wrench is disposed on said first end of said respective first plier or second plier, said member of each of said wrenches has a lock being movably integrated into said top side, said lock on said member being positioned adjacent to said distal end, said lock releasably engaging a detent within said respective plier when said respective wrench is attached to said respective plier.

* * * * *